(12) United States Patent
Osann, Jr.

(10) Patent No.: US 7,986,976 B2
(45) Date of Patent: Jul. 26, 2011

(54) VIBRATING WIRELESS HEADSET FOR WIRELESS COMMUNICATION DEVICES

(75) Inventor: Robert Osann, Jr., Cupertino, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 994 days.

(21) Appl. No.: 11/803,081

(22) Filed: May 11, 2007

(65) Prior Publication Data

US 2007/0213100 A1 Sep. 13, 2007

Related U.S. Application Data

(62) Division of application No. 10/074,610, filed on Feb. 13, 2002, now Pat. No. 7,231,232.

(51) Int. Cl.
*H04B 1/38* (2006.01)

(52) U.S. Cl. ............ 455/567; 455/566; 455/569.1; 455/556.1; 455/413

(58) Field of Classification Search ............ 455/67.7, 455/156.1, 415, 461, 566–567
See application file for complete search history.

(56) References Cited

U.S. PATENT DOCUMENTS

| | | | |
|---|---|---|---|
| 5,991,637 A * | 11/1999 | Mack et al. | 455/563 |
| 6,212,409 B1 * | 4/2001 | Matsuo et al. | 455/566 |
| 6,216,016 B1 * | 4/2001 | Cronin | 455/567 |
| 6,216,017 B1 * | 4/2001 | Lee et al. | 455/567 |
| 6,263,218 B1 * | 7/2001 | Kita | 455/567 |
| 7,010,332 B1 * | 3/2006 | Irvin et al. | 455/575.2 |
| 2003/0078071 A1 * | 4/2003 | Uchiyama | 455/557 |
| 2003/0100261 A1 * | 5/2003 | Gusler et al. | 455/18 |
| 2003/0109288 A1 * | 6/2003 | Carley et al. | 455/567 |
| 2007/0100922 A1 | 5/2007 | Ashish | |
| 2007/0115878 A1 | 5/2007 | Ashish et al. | |
| 2007/0117537 A1 | 5/2007 | Hui | |
| 2007/0202867 A1 | 8/2007 | Waltho et al. | |
| 2007/0249341 A1 | 10/2007 | Chu et al. | |
| 2008/0010208 A1 | 1/2008 | Callaway | |
| 2008/0080604 A1 | 4/2008 | Hur et al. | |
| 2008/0086286 A1 | 4/2008 | Shellhammer | |
| 2008/0089306 A1 | 4/2008 | Hu | |
| 2008/0108366 A1 | 5/2008 | Hu | |

(Continued)

FOREIGN PATENT DOCUMENTS

WO WO-2007-043827 4/2007

(Continued)

OTHER PUBLICATIONS

U.S. Appl. No. 60/356,323, filed Feb. 2002, Argones et al.*

*Primary Examiner* — Dai A Phuong
(74) *Attorney, Agent, or Firm* — Volpe and Koenig, P.C.

(57) ABSTRACT

A remote controller/communicator device is described that aids in answering and processing incoming calls in a manner courteous to those in close proximity to the receiving party. These devices provide a silent, vibrating ring indication in a small wireless device that can be kept close to the user's body. Some embodiments also include bi-directional voice communications with a mobile phone thereby also implementing a wireless headset function. Additional embodiments further include a delayed "courtesy answer mode", where the receiving party manually activates a recorded or automatically constructed message to be played for the caller, indicating that the receiving party will take their call shortly, and/or is relocating to a location where they will be better able to receive the call.

18 Claims, 11 Drawing Sheets

Wireless Vibrating Remote
Controller/Communicator
(Carried in Pocket or Holster)

U.S. PATENT DOCUMENTS

| | | |
|---|---|---|
| 2008/0112467 A1 | 5/2008 | Shellhammer |
| 2008/0165680 A1 | 7/2008 | Chang |
| 2008/0165754 A1 | 7/2008 | Hu |
| 2008/0166974 A1 | 7/2008 | Tes et al. |
| 2008/0207204 A1 | 8/2008 | Vlantis et al. |
| 2008/0212725 A1 | 9/2008 | Tang |
| 2008/0261639 A1 | 10/2008 | Sun et al. |
| 2008/0268832 A1 | 10/2008 | Peng |
| 2008/0268892 A1 | 10/2008 | Hamdi et al. |
| 2008/0293353 A1 | 11/2008 | Mody et al. |
| 2008/0293410 A1 | 11/2008 | Chan et al. |
| 2008/0299918 A1 | 12/2008 | Jallon et al. |

FOREIGN PATENT DOCUMENTS

| | | |
|---|---|---|
| WO | WO-2007-053196 | 5/2007 |
| WO | WO-2007-056081 | 5/2007 |
| WO | WO-2007-081503 | 7/2007 |
| WO | WO-2007-094604 | 8/2007 |
| WO | WO-2007-096819 | 8/2007 |
| WO | WO-2007-100323 | 9/2007 |
| WO | WO-2008-013429 | 1/2008 |
| WO | WO-2008-032999 | 3/2008 |
| WO | WO-2008-086243 | 7/2008 |
| WO | WO-2008-090509 | 7/2008 |
| WO | WO-2008-097253 | 8/2008 |
| WO | WO-2008-107854 | 9/2008 |
| WO | WO-2008-114216 | 9/2008 |
| WO | WO-2008-140417 | 11/2008 |
| WO | WO-2008-144323 | 11/2008 |

* cited by examiner

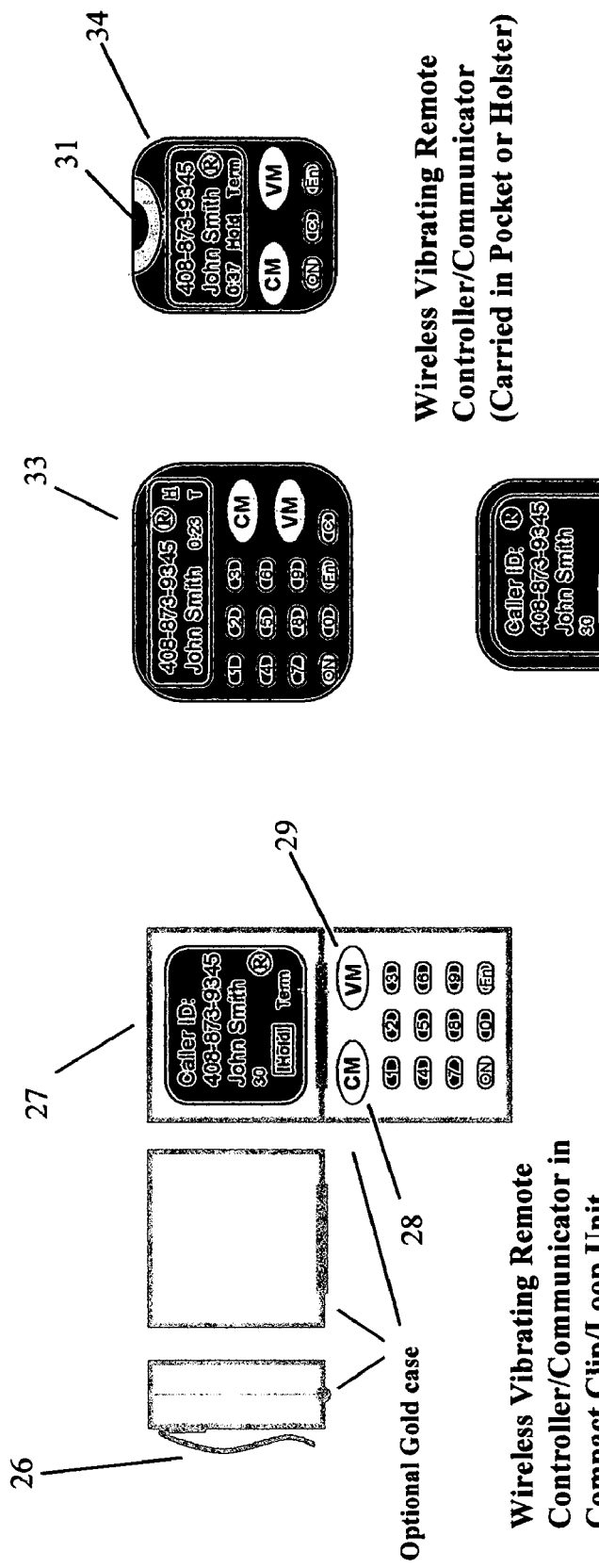

Prior Art Wireless Headset

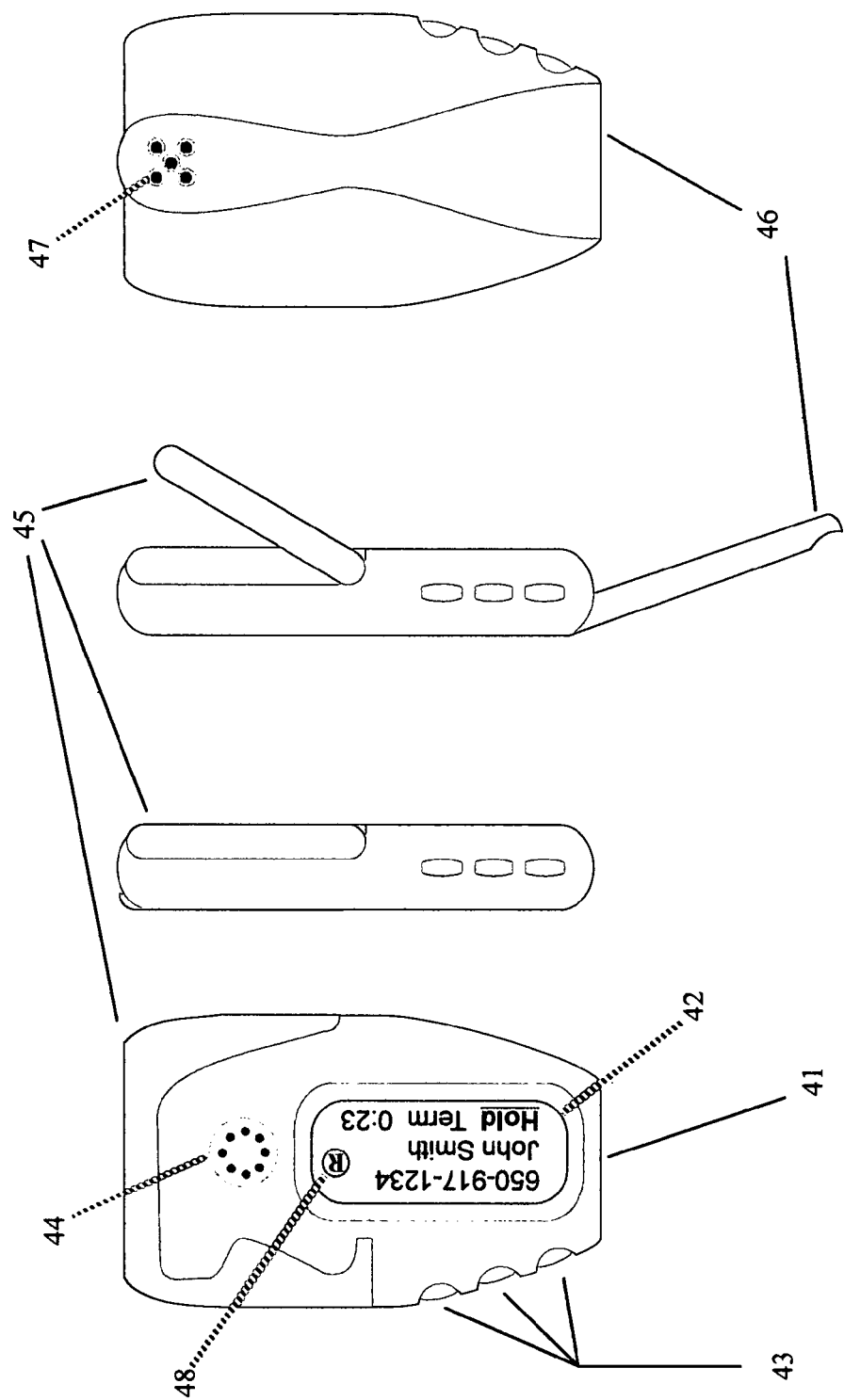

VIBRATING WIRELESS HEADSET FOR WIRELESS COMMUNICATION DEVICES

CROSS REFERENCE TO RELATED APPLICATIONS AND DISCLOSURES

This is a Divisional Application of U.S. application Ser. No. 10/074,610 filed on Feb. 13, 2002 now U.S. Pat. No. 7,231,232.

FIELD OF THE INVENTION

This invention relates mostly to the operation of mobile phones such as cellular phones or any form of mobile wireless communication device capable of voice communication, and in particular, features within the user-interface functionality of such phones regarding how calls are answered as well as accessories that enhance the process of answering and processing incoming calls.

BACKGROUND

Mobile phones (alternately referred to as cellular or wireless phones) have been proliferated to the point that in any gathering or meeting of people today, one can predict with a reasonable degree of certainty that sometime during the meeting, a mobile phone will ring, causing some degree of disturbance, disruption, and/or aggravation. Sometimes, people are requested to turn off their phones and yet a phone still rings.

Many phones have vibration modes to indicate incoming calls. While this usually prevents the disruption caused by an audible ring, people still feel compelled to answer such calls. This means they will start talking, thereby disrupting the meeting or gathering, even if they simultaneously get up and exit the room. Also, people naturally talk relatively loudly when conversing on mobile phones, so any initiation of a call is rarely done quietly.

Currently, it is becoming more frequent to find mobile phones being banned in meetings, gatherings, and restaurants. This trend will undoubtedly continue given the ongoing reductions in the costs of mobile service and the resultant proliferation of mobile phones. Eventually, people who have a strong need to stay in contact with others for critical business communications will find their business activities suffering due to being out of touch while in meetings, gatherings, and restaurants. One option is to activate the phone to answer the call and then walk to a location suitable for talking. However, many conference rooms and certainly most restaurants and theaters are large enough that the time required to move to a proper location is too long to expect the calling party to wait without hearing some response from the receiving end. Also, the receiving party may not want the calling party to hear the background sounds that exist in the receiving party's ambient environment.

One capability that does exist (at least in some Nextel phones) is the capability to send a caller immediately to voicemail by pressing a button. This is typically used by persons who have left their phones in an audible "ring" mode (as opposed to a silent "vibrate") and want to curtail the disturbance caused by the ringing sound. Otherwise, the only other effect of using this feature is to send the caller into voicemail after one or two rings instead of the usual four or more rings—something that makes little difference to the caller. However, if the receiving party wishes to accept the call, this feature is of little or no value.

If the situation is one where disturbing others is an issue, what typically happens is that the receiving party will answer the phone and start the conversation while they are standing up and starting to walk out of the room. They may even attempt to talk softly as they do this, but most often, the damage relative to disturbing others is already done. Besides the actions just described, the only other choice the receiving party has today is to ignore the call and let it go into voicemail.

Many times, calls are just too important to ignore. What is needed is a method that allows the person receiving the call to do so in complete silence while allowing them to exit the room in a quiet, non-rushed manner, thereby showing a maximum amount of courtesy to those in the meeting or gathering. At the same time, this needed method should not inconvenience, confuse, or aggravate the caller. Such a capability does not exist in mobile phones today.

In addition to mobile phones, a variety of digital electronic devices such as PDAs (Personal Digital Assistants) and even miniature notebook computers are evolving to have wireless connection capability, not only for email and Internet connectivity, but also for voice communication. This voice communication capability essentially allows such mobile communication devices to function in a similar way to a mobile phone, usually by connecting some form of wired or wireless headset to the unit. Conversely, some mobile phones are being produced that when opened, become a PDA with a larger display and QWERTY-style keyboard. Similar problems to those listed above regarding courtesy issues at gatherings apply to these combination units in a similar way. Although the descriptions in this specification refer to what is currently termed cellular, wireless, or mobile phones, it is understood that they also apply to any mobile or wireless device with voice communication capability where such courtesy issues are important or significant.

One additional and emerging capability is to use wireless technology to implement all the phones within a business office as mobile phones that act like cellular/wireless phones so that employees can be better connected. Given this trend, references in this specification to the "Service Provider" may be interpreted to be a conventional mobile/cellular service provider such as Sprint, Verizon, CellularOne, Nextel, etc., or alternately, equipment located locally within an office building or office campus, or some combination of a conventional mobile service provider and local equipment functioning in unison or collaboration.

Another problem that exists with regard to answering mobile phones occurs in those circumstances where it is not practical or desirable to have the phone (or digital communication device capable of voice communication) in close enough proximity to the user to enable the vibration ring indicator to be effective. One such circumstance arises when the phone or communication device is too large to be comfortably placed in a pocket or in a belt holster. This will happen more and more as PDAs and small computers become voice enabled. The other circumstance occurs when the user does not have a pocket in which to place the mobile phone, or does not wish to place the phone in a belt holster (or does no wear a belt) due to reasons relating to style of dress. Most often, issues relating to dress will arise for the mobile businesswoman who wears a dress or suit with no pockets and/or no belt, or where the bulge or protrusion of a phone would not integrate well with their ensemble. In all of the above circumstances, the normal phone vibration mode is useless and the user must rely on an audible ring to know when there is an incoming call. This means that important calls will be missed with the phone turned off, or that the user will be compelled to allow an audible ring in meetings, thereby disturbing others. Of course, when phones are banned in meetings, there is no choice but to miss the call unless an alternative solution is available, such as a miniature wireless remote ring indicator that vibrates.

Unfortunately, in many business meetings held in closed conference rooms, the ambient noise level is so low that any audible ring indication, unless emitted from a device inserted in the user's ear, can probably be heard by others. In fact, most mobile phones, when in vibrate-only mode, are audible to others unless they are physically damped by being pressed close to the user's body. Better solutions are needed to all these problems since it is quite probable that mobile phones and voice-capable digital computing/communication devices will be banned in most gatherings within the foreseeable future.

SUMMARY

Solutions for answering a call on a mobile phone are described, including a mode where the receiving party activates a special "courtesy answering mode". Here, the receiving party manually activates a recorded message to be played for the caller, indicating to the caller that the receiving party will take their call shortly. The message may also say that the receiving party is relocating to a location where they will be able to better receive the call. The receiving party can then move in a quiet and unhurried manner, without feeling compelled to start talking to the calling party. When the receiving party reaches the appropriate location, they can activate the phone to initiate the phone conversation with the calling party. In addition, various remote controller/communicator accessories are described to further aid in answering and processing an incoming call.

BRIEF DESCRIPTION OF THE DRAWINGS

The present invention is described with respect to particular exemplary embodiments thereof and reference is accordingly made to the drawings in which:

FIGS. 9a and 9b show a variety of configurations for remote ring indicator/controller/communicators.

FIG. 11 shows an example of a vibrating wireless headset according to this invention.

DETAILED DESCRIPTION OF THE INVENTION

Figure 1:
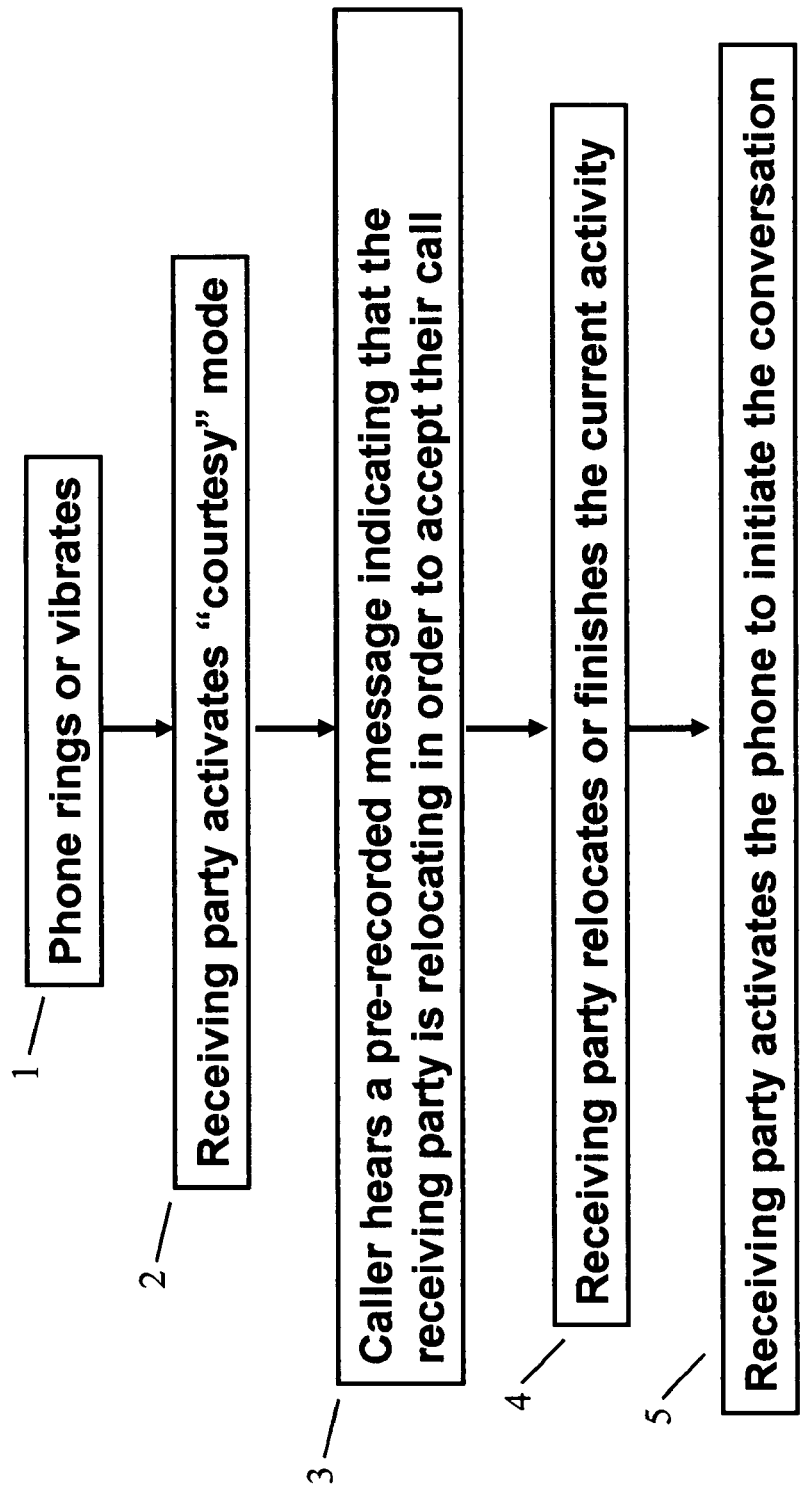
FIG. 1 shows a flow chart for a possible sequence of events that provide a more courteous scenario for those in proximity to the receiver of a call.

FIG. 1 shows a flow chart for a possible sequence of events that provide a more courteous scenario and less disruptive experience for those in proximity to the person receiving a mobile phone call. Here, Step 1 initiates the process by a ring indication to indicate an incoming call. In this specification, a "ring indication" may be any form of signal to the user that an incoming call is "ringing", including an audible ring or inaudible vibration or both, or a flashing icon on the phone's display that may be used independently or in addition to an audible ring or vibration. Normally a phone will be set to start out in vibration-only mode when courtesy is an issue. However, some methods described in this specification include changing the ring indication mode during the processing of deciding how to process the incoming call, providing less disruption to others in proximity to the receiving party by this change of ring indication mode.

The receiving party can then choose not to answer the call (automatically sending it to voicemail if available) or alternately, can activate the "courtesy" feature (Step 2). The user interface on the phone can be designed to activate the phone by a single button press, by a combination of button presses (like the use of a function key followed by some other key), or by a pick from a menu. However, the receiving party will often feel compelled to make a quick decision. Usually, calls go into voicemail after a specific number of rings, the anticipation of which may pressure the receiving party. Also, the caller ID display is often delayed and additional time is consumed if the phone must be extracted from a pocket or holster, all putting time pressure on the receiving party. It is therefore important that whatever action is required to activate the courtesy feature is simple, convenient and, and, if possible, intuitive. Note that in this specification, the term "button" and "key" are often used synonymously. For instance numerical keys may be referred to as buttons, and buttons that activate a specific function may be referred to as function keys.

After the receiving party has manually activated the courtesy feature, the caller will hear a pre-determined message (Step 3) indicating in effect that the receiving party will take their call shortly and/or that the receiving party is relocating in order to be able to accept their call. This message may also include a request that the caller please wait a few seconds, and/or that the caller should please be patient. This scenario is decidedly different from a conventional receptionist placing a caller on hold, since here, the caller is specifically informed that the receiving party knows they are calling and has committed to accept the call shortly. If the "party is relocating" message has been played, the caller has additionally been informed of the reason for the delay in accepting the call—adding an extra element of courtesy to the caller and making them feel more important than simply being paced on hold. (It is a known fact that simply being placed on hold is aggravating and sometimes even demeaning to the caller).

The scenario described here is also decidedly different from that where a person with "call waiting" greets a caller by requesting that they "please hold" since here, the receiving part is not able to actually talk to the caller due to the receiving party's physical environment. Further, the scenario described here is also decidedly different from that where an automated greeting played by phone equipment requests that the caller wait, since in that circumstance, there is no indication to the caller that the specific person they are attempting to reach is aware of their call or is even available.

After the "courtesy message" described above has been played, the caller is normally placed on "hold" at this point. Next, the receiving party may, in an unhurried manner, complete their current activity and/or leave the room and relocate (Step 4) to an area where they can converse without disturbing anyone (the "courtesy period" or "relocation period"). Last, the receiving party activates the phone to actually begin the conversation (Step 5). This final step of activation could be done by a variety of mechanisms contained in the phone's user interface, but is most intuitively performed by pressing the "Send" button—the convention on many phones for answering a call. Pressing the "courtesy" button an additional time can also be a way to activate the conversation.

Note that the "pre-determined" message mentioned above need not actually be pre-recorded. Instead, the message could be pre-scripted and the actual voice can be digitally synthesized based on the script. Messages that carry additional information for the caller will be discussed later.

Figure 2:
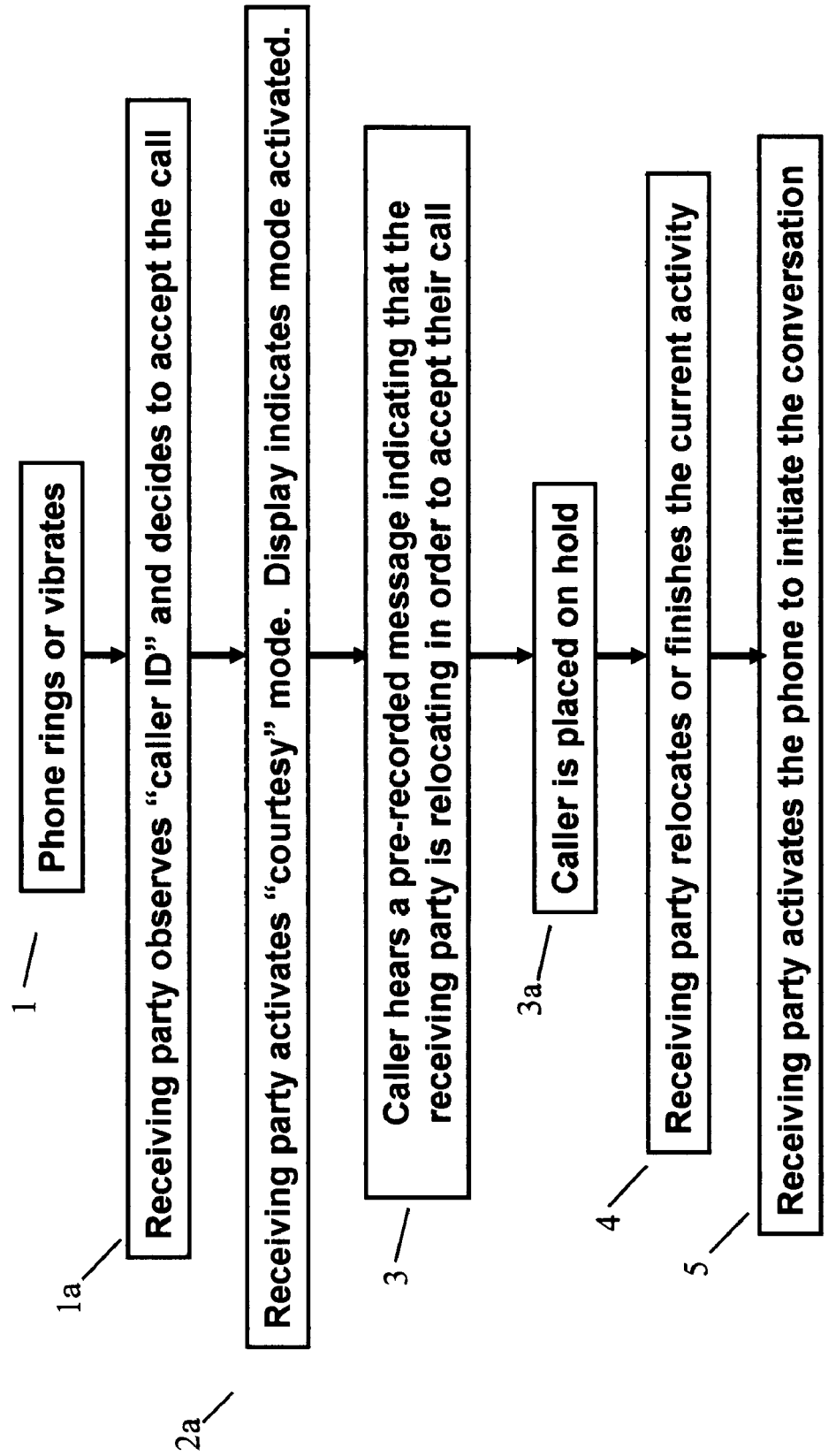
FIG. 2 shows a flow chart for a possible sequence of events that provide a more courteous scenario for those in proximity to the receiver of a call, including the option of the receiving party to answer the call or not based on observing the "caller ID".

FIG. 2 shows a flow chart for another possible sequence of events that provide a courteous scenario for those in proximity to the receiver of a mobile phone call, including the optional step (Step 1*a*) where the receiving party may decide to answer the call or not based on observing the "Caller ID". FIG. 2 also specifically shows the step (Step 3*a*) of placing the caller on hold while the receiving party relocates. While on "hold", the caller may hear an imposed silence or may hear some for of recording (music, news, etc.) although since the caller is expecting a very short wait, silence might be more appropriate. It is valuable to avoid an audio connection during the relocation period, since there may be conversation or background noises in the receiving party's environment that he or she does not wish the caller to hear. During the relocation period, there should be a visible indication on the phone's display that the courtesy mode has been activated (included in Step 2*a* in FIG. 2) as a means of feedback to the receiving party and to remind them that the caller is on hold. Some kind of blinking indication would be useful for this purpose. If the caller hangs up while courtesy mode is active (during the courtesy or relocation period), this special "hold" indication would turn off. Under these circumstances, there could also be a message to the receiving party to the effect that the courtesy mode terminated by the caller, which could be abbreviated and displayed as "CM Term" or just "Term", for example.

Many mobile phones today contain a Caller ID display feature. Although it typically takes an extra ring before this information appears on the display of the phone, it is extremely useful for the receiving party, in the courtesy scenario described herein, to be able to observe the Caller ID information. This enables them to quickly decide if they wish to accept the call or not, since accepting the call means that they must leave the room to initiate a conversation. Some mobile phones are of the "flip-phone" variety where the keypad is on a hinged platform that flips up to cover the display when the phone is closed. Other flip-type phones have a hinged cover that covers the keypad and/or display, and may also include the microphone so that the microphone is placed in closer proximity to the user's mouth when the phone is open. These flip-type phones usually answer a call automatically when opened, but can usually be reprogrammed to not answer upon opening, thereby allowing the receiving party to observe the "caller ID" feature and decide if they wish to accept an incoming call.

Given the time pressure applied to the receiving party when using the caller ID feature, it becomes even more important that the activation of the courtesy mode is extremely simple—preferably by way of a button on the phone specifically designed for this purpose. While it is possible to expand the courtesy mode to include a number of response message choices in addition to the primary courtesy message announcing, in effect that "the receiving party will take their call shortly" or a "delay while the receiving party relocates", requiring the user of the phone to select one of a number of response messages in a hurry after taking the time to observe the Caller ID information, adds an additional level of difficulty and delay. In fact, if such a menu of possible response messages is offered as part of the courtesy future, the most practical user interface for the phone should have the primary courtesy message as the default or primary message that can be chosen in the least amount of time and with the least complexity (or fewest number of button pushes).

Figure 3:
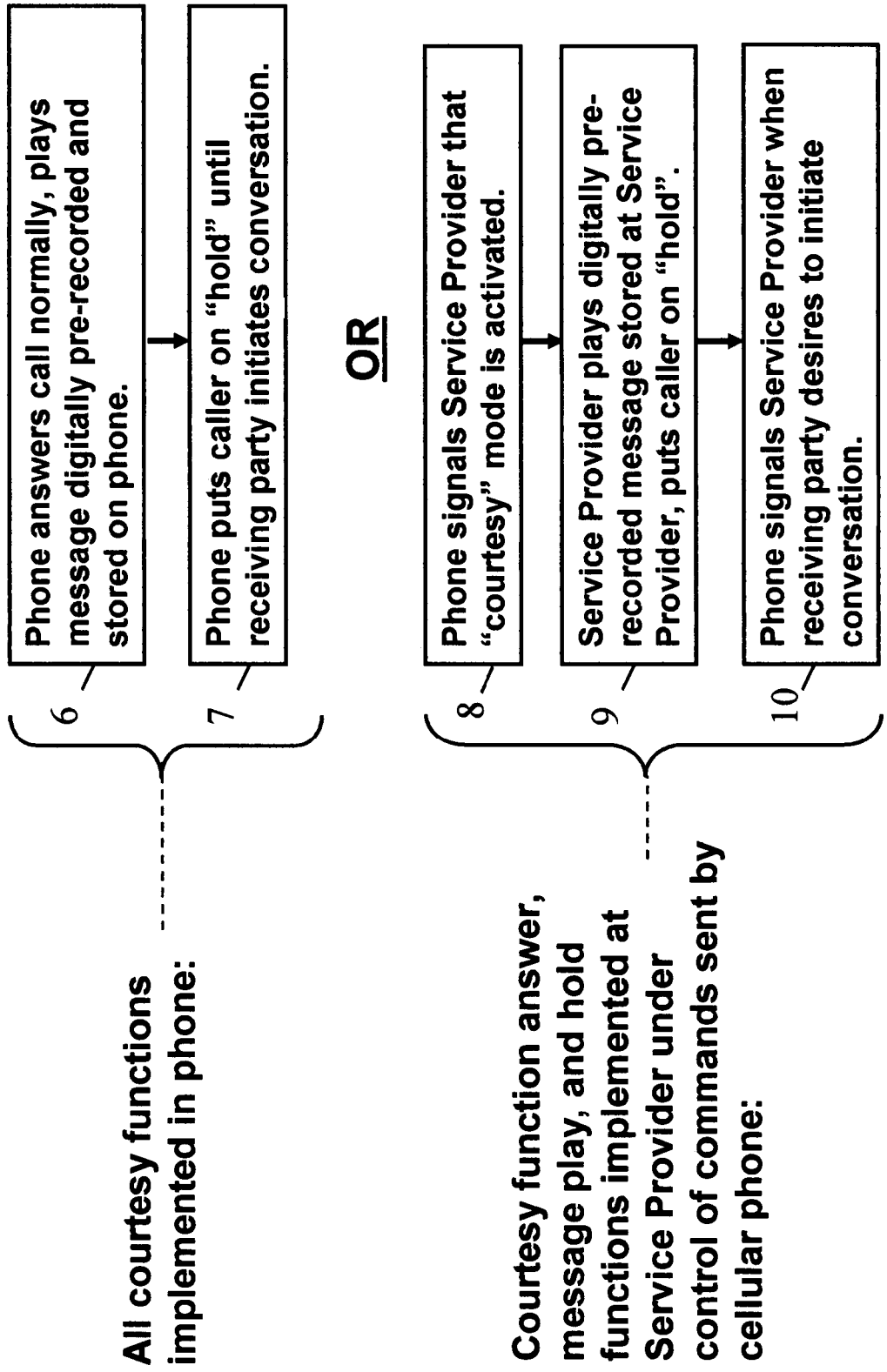
FIG. 3 shows two alternative implementation scenarios for the methods of FIGS. 1 and 2 relative to the role of the Service Provider.

FIG. 3 shows a further level of detail including two possible implementations for the courtesy answering method of FIGS. 1 and 2 with regard to the role of the mobile service provider. In the first scenario, described by Steps 6 and 7, the courtesy answering feature is implemented entirely within the mobile phone, thereby not requiring any change in the software capabilities residing at the mobile service provider. The second scenario, described by steps for 8, 9, and 10, includes communication between the mobile-phone and the service provider whereby the service provider's equipment provides any messages and also implements putting the caller on hold and finally initiates the conversation.

In Step 6, upon activation of courtesy mode, the mobile-phone will answer the call, play a digitally pre-determined message that has been stored in the phone, and then place the caller on "hold" (Step 7) until the receiving party is in position to initiate a conversation. During the time the caller is on hold, the caller will hear no sound, or could hear pre-recorded sounds or music, but will normally not hear the ambient sounds surrounding the receiving party. Steps 6 and 7 are therefore implemented completely within the mobile phone itself, and do not involve any interaction with the mobile service provider.

In an alternative method, upon the receiving party's activation of courtesy mode, the mobile-phone provides a signal to the mobile service provider that courtesy mode has been activated (Step 8), along with any associated information. The service provider then plays the appropriate digitally pre-determined message to the calling party (Step 9), and then puts the calling party on hold. Finally, after the receiving party has physically relocated to a location where they can comfortably enter into a conversation and has pressed the appropriate button(s) on the phone to signal as such, the mobile phone then provides a signal to the service provider (Step 10) signaling the service provider to complete the connection between calling and receiving parties to initiate a conversation.

In a modified version of the sequence of Steps 8, 9, and 10, the receiving party could select one of a number of pre-determined messages and actions from a menu, since the service provider is involved in these actions and it is normally the service provider that also provides control of, and implementation for, voicemail capability. However, it is important that the activation of courtesy mode (typically including a message that the receiving party will take their call shortly and/or that the receiving party is relocating) does not send the caller into voicemail, and that courtesy mode be the easiest function to activate since it requires the quickest decision on the part of the receiving party.

If a menu-style user interface is utilized, a menu of possible choices for actions to be taken by the service provider in this modified version of steps 8, 9, and 10 could be as follows:
1) Play "courtesy mode" message, place caller on hold, wait for signal from receiving party to initiate connection. (do not send caller to voicemail)
2) Play "I will call you back in 10 minutes, please leave a message if you desire" and send caller to voicemail.
3) Play "I will call you back in 30 minutes, please leave a message if you desire" and send caller to voicemail.
4) Play "I will call you back in 1 hour, please leave a message if you desire" and send caller to voicemail.

The above menu is just one example, and may variations on this theme are possible. If a menu similar to that shown above were to be offered, the receiving party must be able to choose the first item with a minimum number of button pushes, and a minimum degree of complexity. Preferably, if there is a special button for courtesy mode, and that button were to cause a menu of multiple choices to be displayed, pressing that same button a second time would, for instance, be a quick and simple way to choose the first item on the list—as opposed to having to use separate up/down buttons for scrolling and then a different button to choose a specific item from the menu.

Figure 4:
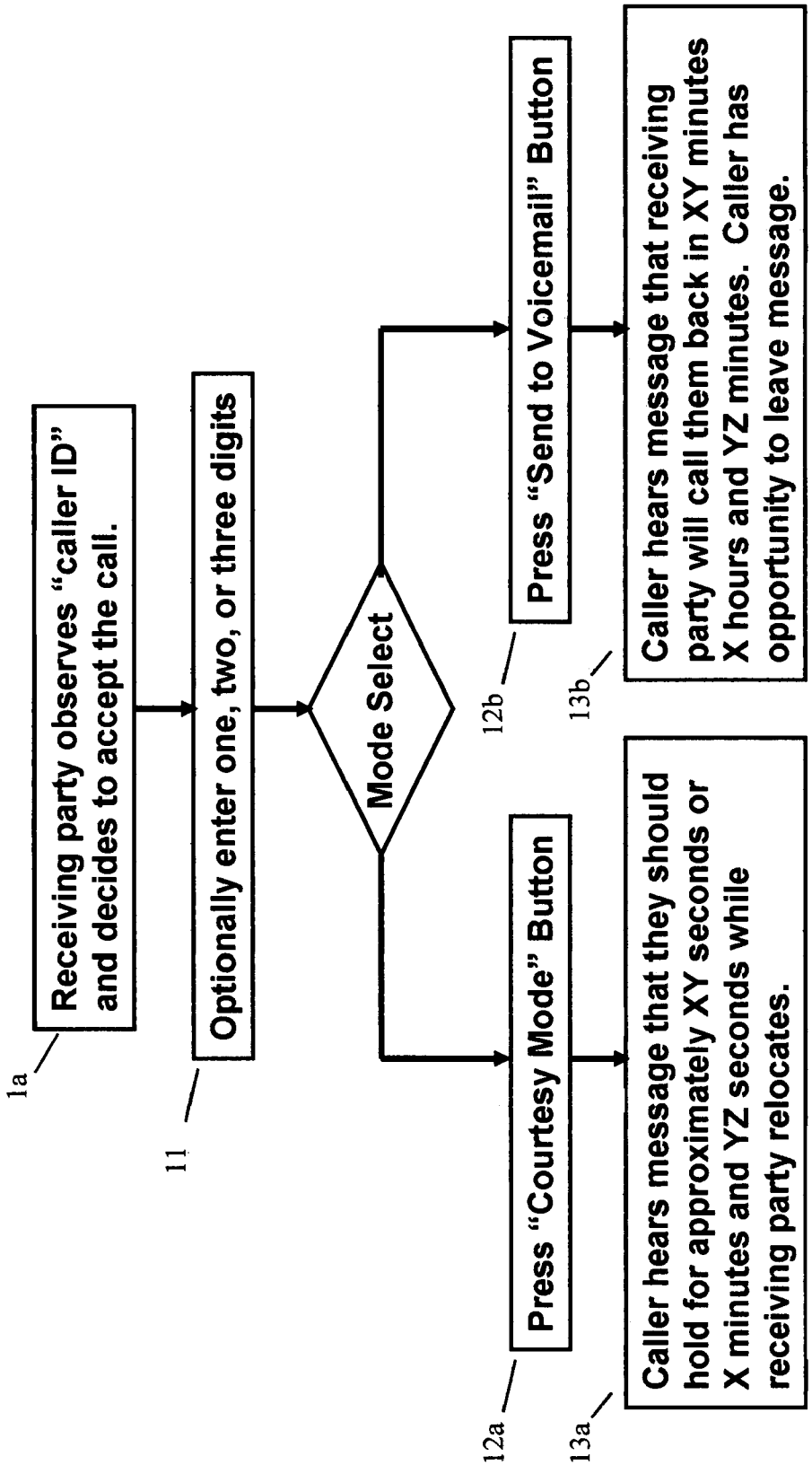
FIG. 4 shows a flow chart describing the use of button presses prior to activating either the "Courtesy Mode" or "Send-to-Voicemail" functions.

FIG. 4 shows an alternate method for handling both courtesy mode and conventional voicemail where, instead of choosing actions from a menu, actions are defined by pressing function keys after optionally pressing some combination of numerical keys. As before, the receiving party observes the caller ID and decides to accept the call (Step 1*a*). Then, they can optionally enter some number of numerical digits before pressing a function key. Step 11 shows one, two, or three digits as an example. This number of digits is especially useful for both courtesy mode and send-to-voicemail mode. After entering some number of digits, the receiving party would press the specific function key for either courtesy mode or send-to-voicemail mode. In other words, the interpretation of the digits is not determined until the function key is pressed. Although a number of paradigms for numerical entry may be used here, a very intuitive method would be to enter digits in a manner similar to that used at all ATM machines where each digit moves to the left as more digits are entered. This also allows less time to be consumed if fewer digits are needed. Most important, the method of FIG. 4 allows no digits to be entered before pressing a function key thereby providing a simple and intuitive default mode (which most users will probably use most of the time).

Note that the two function keys referred to in FIG. 4 for courtesy mode and send-to-voicemail mode may be "soft" defined keys as opposed to dedicated function keys. Many mobile phones today have two soft keys available. They could also be function keys requiring a two key sequence or the simultaneous pressing of two keys, although these alternatives are less desirable due to their complexity and the extra time it would take to execute their operation.

As shown in FIG. 4, numerical button presses prior to pressing the courtesy mode key (Step 12*a*) could define the following functions (Step 13*a*):

| Key Sequence | Message |
| --- | --- |
| no digits | Please wait while <receiving party> relocates in order to accept your call |
| 1 digit (X) | Please wait approximately X seconds while <receiving party> relocates in order to accept your call |
| 2 digits (XY) | Please wait approximately XY seconds while <receiving party> relocates in order to accept your call |
| 3 digits (XYZ) | Please wait approximately X minutes and YZ seconds while <receiving party> relocates in order to accept your call |

In a similar manner, numerical button presses prior to pressing the send-to-voicemail mode key (Step 12*b*) could define the following functions (Step 13*b*):

| Key Sequence | Message & Function |
| --- | --- |
| no digits | Normal or Special voicemail greeting. |
| 1 digit (X) | <receiving party> will return your call in approximately X minutes, please leave a message if you desire. |
| 2 digits (XY) | <receiving party> will return your call in approximately XY minutes, please leave a message if you desire. |
| 3 digits (XYZ) | <receiving party> will return your call in approximately X hours and YZ minutes, please leave a message if you desire. |

Note that <receiving party> may be substituted with the specific name of the receiving party.

Obviously, to invoke the voicemail function, the phone must either implement the voicemail function, or alternately communicate with the service provider (where the voicemail function is normally implemented). Also, the messages just described are not entirely pre-determined since the time-related portion of the message must be generated to correspond to button presses chosen by the user at the time of responding to the incoming call. Therefore, portions of these messages must be synthesized in real-time, or pieced together in real-time from a library of pre-recorded or pre-scripted words representing all of the possible or necessary component words needed to build any allowable message. In addition to a default courtesy message recording that might specifically say "please wait while <receiving party> relocates in order to accept your call", the mobile phone user should also have the option of recording their own customized courtesy greetings.

For the functions described above where numerical buttons are pressed prior to answering or otherwise processing an incoming call, a useful capability would be to extend the amount of time ring indications occur (or increase the number of allowable rings) before the caller is automatically sent to voicemail or automatically receives a message that the receiving party is not available. This provides the receiving party with additional time to observe the caller ID, make the decision for the disposition of the call, and press whatever buttons are required. To implement this feature, any button pressed while ring indications are in progress will cause this extension of time.

For the modes where time-frames are inserted into the message, the words representing numerical values can be pre-recorded by the user or inserted in an arbitrary or synthesized voice. An example of a customized courtesy greeting is: "Hello, you've reached John Smith. Please stay on the line since I will be able to take your call in just a few seconds. I'm currently in a meeting and need to leave the room in order to be able to talk. Thanks for being patient."

Where the user has selected to send the caller to voicemail with no call-back time-frame specified, the message can optionally be a special voicemail greeting that, unlike a normal or conventional greeting, provides some indication to the caller that the receiving party is, in fact, aware that the caller has called, and that they are tied-up in a meeting but will get back to the caller as soon as possible, although they are not sure when they will be able to do so.

Figure 5:
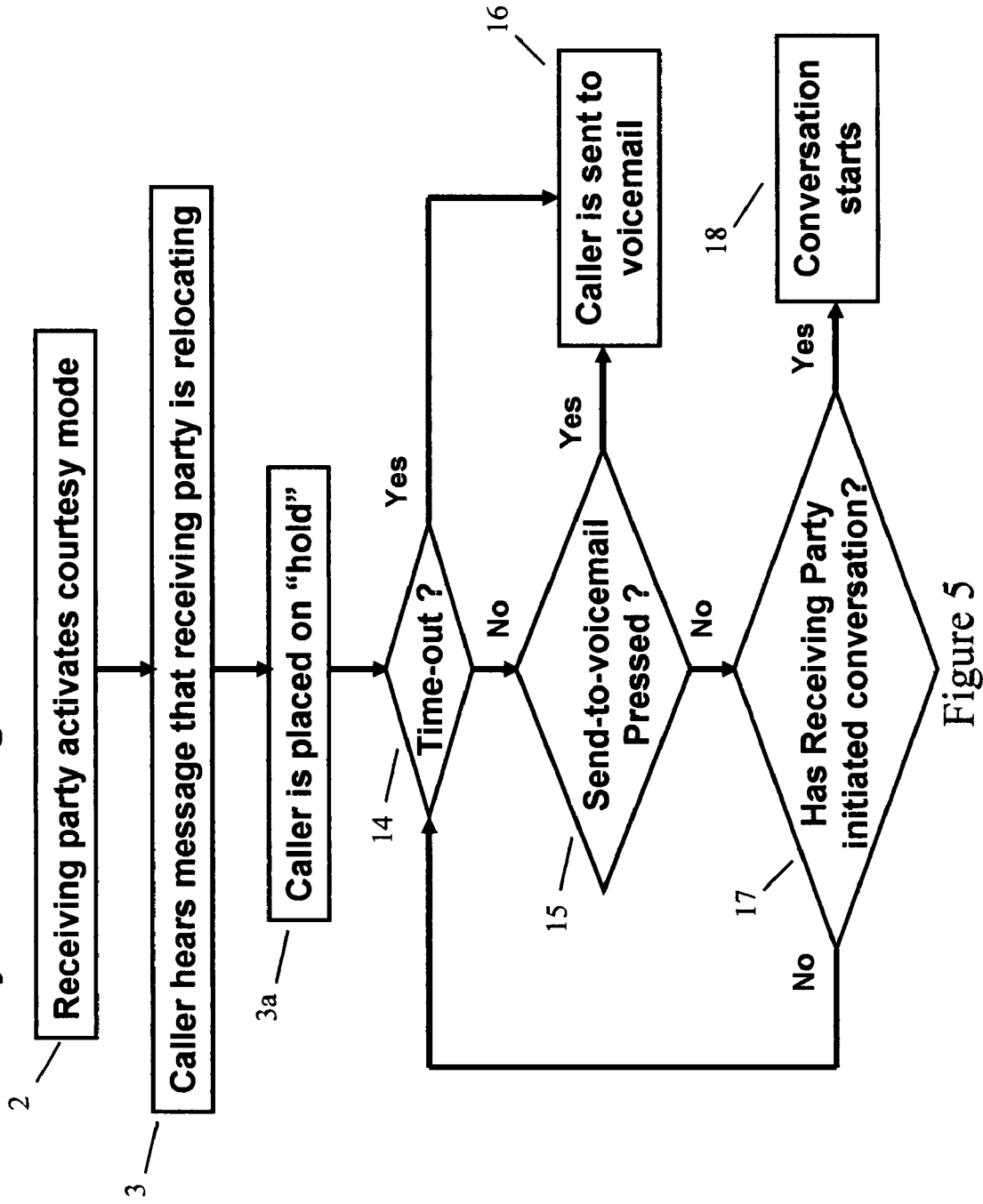
FIG. 5 shows a flow chart describing the capability for sending the caller to voicemail if the receiving party cancels "Courtesy Mode" or if a pre-determined time-out period has elapsed.

FIG. 5 shows a flow chart describing a capability for canceling courtesy mode and sending the caller to voicemail in case the receiving party is forced to reverse their decision to accept the call via courtesy mode. The situation is also described where the receiving party initiates courtesy mode and is subsequently delayed in initiating the conversation due to an unforseen distraction or forgetting the caller is on "hold", thereby requiring that the caller is sent to voicemail after a pre-determined time period (time-out) has elapsed. To indicate to the receiving party that the time-out is about to elapse, an optional brief warning beep or vibration can be emitted some number of seconds before the caller on hold is sent to voicemail. After courtesy mode has been initiated (Step 2) and the caller has been placed on hold (Step 3a), timeout checks (Step 14) are performed as well as checks to see if the receiving party has decided to send the caller to voicemail (Steps 15 and 16). If the receiving party presses the appropriate key(s) to initiate the conversation (Step 17), the caller will be removed from hold and the conversation will begin (Step 18). Again, since the ability to send a caller to voicemail is inherent in the functionality required to implement the flow of FIG. 5, there must be a communication link between the phone and the service provider if the voicemail capability is implemented on equipment located at the service provider.

Figure 6:
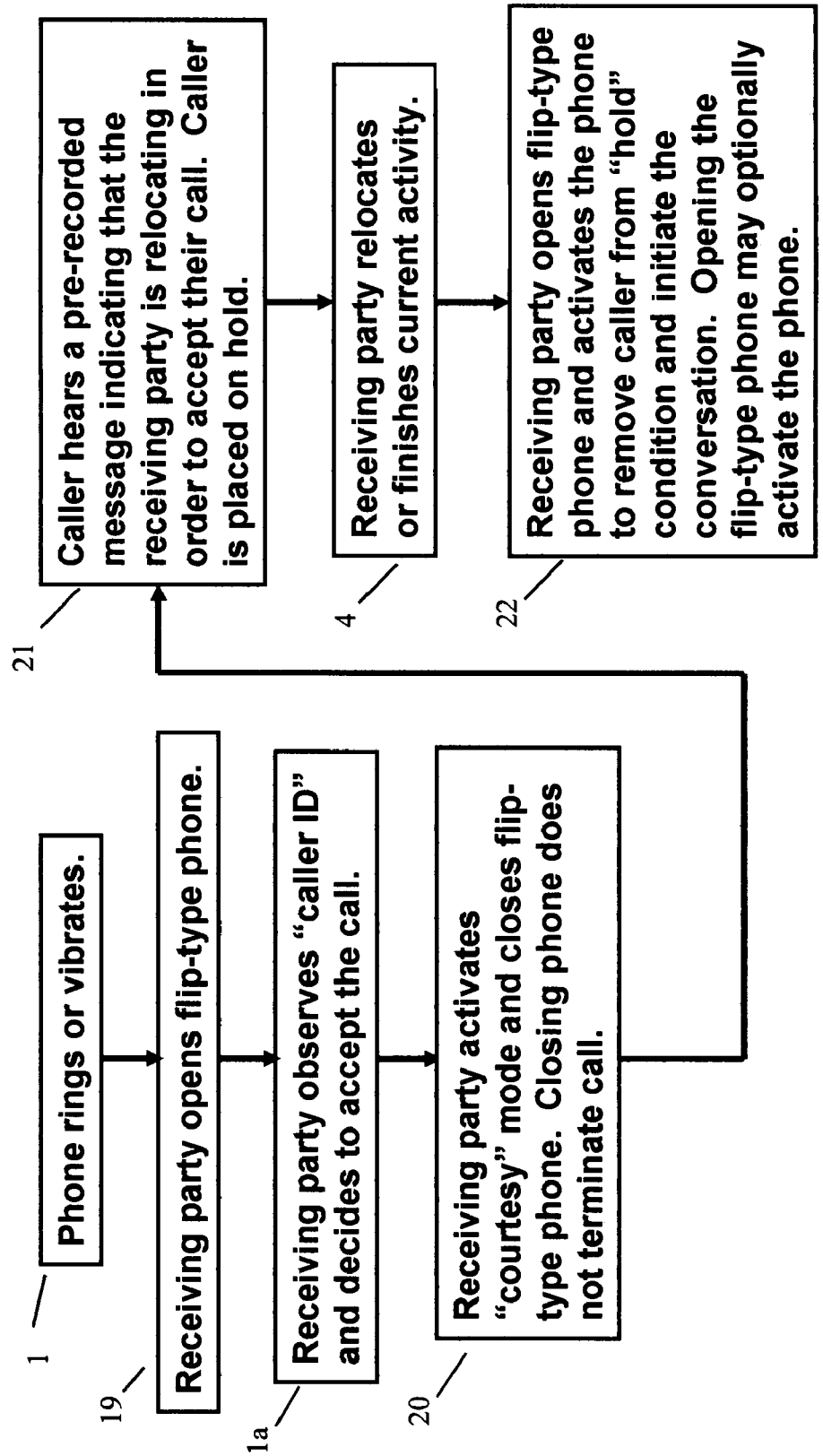
FIG. 6 shows a flow chart for implementing a courtesy answering method on a "flip-type" mobile phone.

FIG. 6 describes functionality specific to "flip-type" mobile phones. Here, the receiving party opens the phone (Step 19) after it starts to ring and/or vibrate in order to observe the caller ID display (Step 1a). In this sequence, the phone does NOT accept the call upon opening. Should they initiate courtesy mode, they can then close the phone (Step 20) without the call being terminated (as is normally the case with flip-type phones). This allows them to place the phone back in their pocket, in a phone holster or belt clip, or simply hold it in their hand as if it were inactive, and then walk out of the room as if they were simply leaving the gathering. Finally, when they are in a location suitable for having the conversation without disturbing anyone, the can open the phone (Step 22) and initiate the conversation by pressing the appropriate key. Optionally, the phone can automatically initiate the conversation upon being re-opened while in the hold state during courtesy mode.

Figure 7:
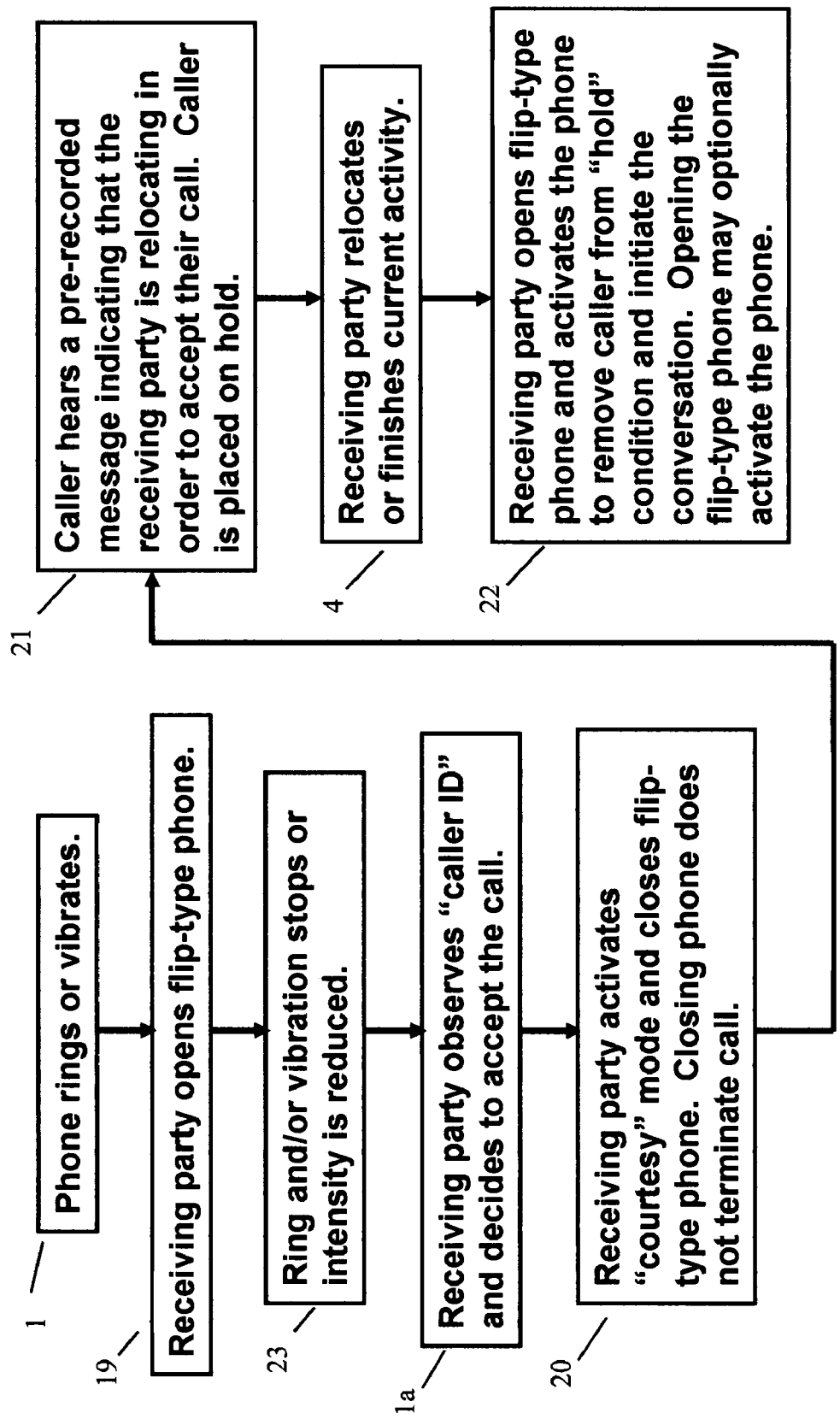
FIG. 7 shows an alternative flow chart for implementing a courtesy answering method on a "flip-type" mobile phone.

FIG. 7 is essentially identical to the flow of FIG. 6 but also adds the capability to alter or stop either the ringing and/or vibration indications (Step 23) when the receiving party opens the flip-type phone. The caller continues to hear ringing and will not know that the receiving party has opened the phone.

Although not offered on phones today, a useful ring mode would be to combine vibration mode with a very low level audible ring for use in environments with a relatively high level of ambient noise. In this environment, the ring would be barely audible to the receiving party and therefore would normally be inaudible to those nearby. The addition of even this quiet ring to the vibration indication would provide an extra level of confidence to the receiving party in situations where the receiving party was so fearful of missing a specific call that they are willing to risk disturbing others at a meeting or gathering. As shown in Step 23 of FIG. 7, the audible portion of the ring/vibrate mode just described can be discontinued when a flip-type phone is opened. Similarly, ringing and/or vibration indications can also be discontinued or altered as soon as certain keys are pressed on a non flip-type phone while an incoming call is in progress. Whenever ringing and/or vibration indications are discontinued, either due to opening a flip-type phone or due to pressing keys on any type of mobile phone, a flashing icon on the phone's display can continue to provide a ring indication so the receiving party will know that the calling party has not hung-up. Also, a flashing icon can be used along with audible or vibrating ring indications if desired.

Since virtually any implementation of the courtesy mode concept of this invention relies on the user receiving a silent (from the perspective of other around them) indication that there is an incoming call, it is important to address the problem that exists with regard to answering mobile phones in those circumstances where it is not practical or desirable to have the phone (or digital communication device capable of voice communication) in close enough proximity to the user to enable the vibration ring indicator to be effective. One such circumstance includes a phone or communication device is too large to be comfortable placed in a pocket or in a belt holster, while the other circumstance occurs when the user does not have a pocket in which to place the mobile phone, or does not wish to place the phone in a belt holster (or does no wear a belt) due to reasons relating to style of dress or social stature. In fact, it is common for employees attending meetings within a company to place their mobile phones on the table in front of them next to their notepad and/or PDA rather than place it in a pocket or holster. This may be due to issues of physical comfort, style of dress, or even simply to display their phone as a way of indicating "I stay connected". Regardless, when the phone is not attached to their body in some way, they cannot feel it vibrate.

Figure 8:
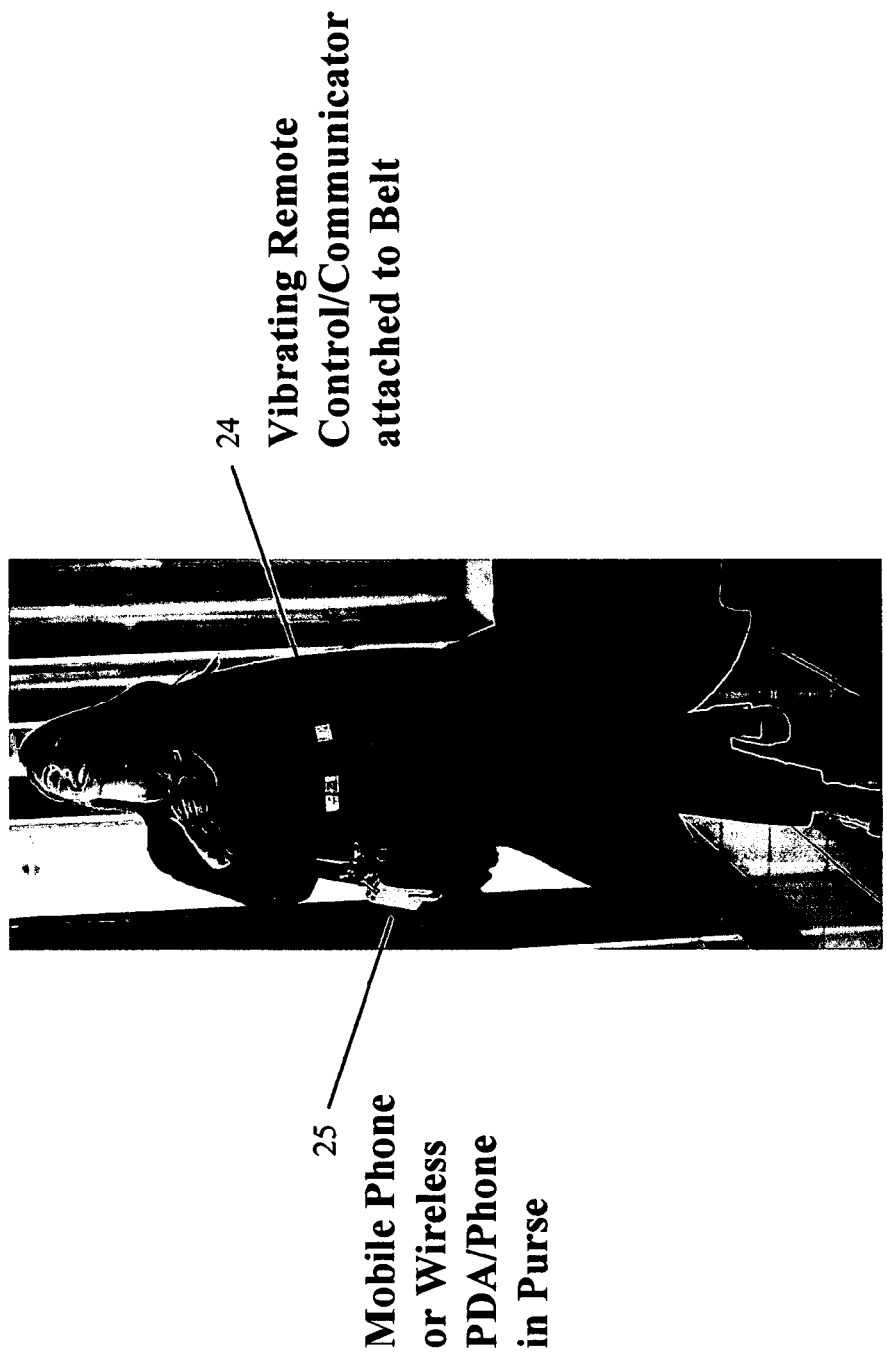
FIG. 8 shows a how a non-disruptive remote ring indicator unit can be used by a businesswoman for use with her mobile phone, the unit optionally providing interaction with the phone.

One solution to the problems related to both the style of dress problem and the size problem of carrying a mobile phone or wireless PDA is shown in FIG. 8 where the focus is on the businesswoman, but has a similar application for the businessman who does not want the bulk of a mobile phone close to their body. Here a vibrating remote controller/communicator 24 is clipped onto the user's belt, while the Mobile phone or wireless PDA is carried in the purse 25. Communicator 24 is shown in a gold exterior finish so that it blends into the user's outfit in a decorative manner. Of course, it could be in black or any other finish. The style shown for communicator 24 folds closed to conceal the display and any buttons. It could attach to the user's belt with a loop to pass the belt through, or alternately, have a clip-on capability 26 as shown in FIG. 9a. In a similar way, miniature vibrating communicators can be designed to slip onto a watch band or bracelet, or be incorporated into various forms of accessories or jewelry. Communications between remote controller/communicator 24 and the mobile phone may be accomplished through a variety of transmission methods and frequencies—the Bluetooth standard mentioned earlier is just one.

It is known to use a remote vibrating ring indication to signal a person who is hearing impaired that an incoming call is occurring on a conventional phone line attached to special "Braille-type" equipment. However, the problem solved here is quite different from that of the present invention. To implement a "courtesy" answering solution for mobile phones, the opposite is desired—rather than desiring a ring be heard, it is instead desired that the ring NOT be heard. Typically, equipment for the hearing impaired uses every available method, including flashing lights and EXTRA LOUD audible signaling (for those with partial hearing loss), to signal the user of an incoming call. Use of a remote vibrating indicator, in the present invention, does not. In fact, it is sometimes desired that REMOTE vibration normally be the ONLY active means of signaling an incoming call since even having the mobile phone itself vibrate can be disturbing to others. Also, prior art ring indicating devices for the hearing impaired do not provide bi-directional communications where the user can selectively cause the phone to enter different modes where special messages are played for the calling party.

Where a remote vibrating indicator/controller 30 is used with a mobile phone that has been inadvertently left in either ring mode, vibrate mode, or both, a button 31 on remote vibrating indicator/controller 30 can send a signal to the phone to cease any audible and/or vibrating ring indications. A flashing icon on the phone's display can take over the task of signaling an incoming call while the user decides what action to take. While the purpose of remotely signaling the mobile phone to silence an audible ring is easily understood, the purpose of signaling to terminate the phone's vibrations is less so. In actuality, mobile phones DO make noise when they vibrate—especially when they are not physically damped by being firmly pressed against larger objects (human body or the interior of a purse or briefcase). Even a phone in the chest pocket of a sports jacket will make significant and noticeable noise if it is not pressed firmly against the body. When sitting on a conference table, a vibrating mobile phone is clearly audible (and disturbing) to others, especially in a meeting where the ambient noise level is low. In these circumstances, it is advantageous to ONLY use a remote vibrating indicator somehow attached to the user's body such that the vibrating indicator is truly silent. Note that remote vibrating indicator/controller 30 may be intended to be placed in a pocket, or may have an attachment loop 32 as shown for belt attachment, or may have a clip 26 as shown on unit 27. A miniature version of a remote vibrating indicator/controller 30 can also be constructed that will fit on a watch-band or bracelet.

FIG. 9a shows a 3-view drawing of a clip-on vibrating remote controller/communicator. The finish could be a decorative gold or silver, or alternatively any other color. The unit could even be designed for the attachment of different exterior shells having different colors. View 27 includes a display that shows the caller ID information for incoming calls, and can also display a variety of status information. This status information can include whether or not the caller has been placed on "Hold" (as is done during courtesy mode) or if the caller has decided to terminate the call. Caller ID and other information is transmitted from the mobile phone or wireless PDA to the remote controller/communicator. If the remote controller/communicator has the capability to enter numerical digits, any sequence entered can be displayed. Also, the remote controller/communicator can include buttons to activate courtesy mode 28 and send-to-voicemail 29. The activation of courtesy mode or send-to-voicemail requires the remote controller/communicator to send command information to the mobile phone or wireless PDA.

If the caller has been placed on hold during the activation of courtesy mode, the elapsed time they have been on hold can also be displayed on the same numerical display that previously could have shown digits entered prior to activating courtesy mode. This elapsed time display is shown in examples 33 and 34 of FIG. 9b. FIG. 9b shows a variety of remote vibrating controller communicators similar to that of FIG. 9a, but instead intended to be carried in a pocket or holster. Units 33 and 34 are shown as open units where the buttons and display are exposed at all times. Unit 35 is shown as a unit that folds into a closed configuration where the buttons are protected from being inadvertently pressed. Units 33 and 35 include a full numerical keypad so that parameters can be entered prior to pressing the courtesy mode or send-to-voicemail buttons, while unit 34 foregoes these buttons to allow a smaller size. Variations on these configurations are possible to allow different degrees of functionality. Unit 34 is also shown with button 31 included that has the function of stopping any ring indication, audible or vibration, that is being emitted by the mobile phone, in order to curtail any disturbance to those in the immediate vicinity.

The units shown in FIGS. 9a and 9b also include a "Function" button (Fn) so that the unit can send a number of additional commands to the mobile phone or wireless PDA by pressing the Fn button in conjunction with a numerical button. Examples of such other commands include altering, terminating, and/or otherwise controlling the ring or ring mode of the phone or PDA. In addition, units 33 and 33 in FIG. 9b are shown with a "Clear" or "Cancel" button. This has many uses including canceling a string of numerical digits entered prior to pressing the courtesy mode or send-to-voicemail buttons, in case the user makes a mistake or changes their mind in the middle of the process.

In addition to providing bi-directional communication with a mobile phone or voice capable digital communications device, the remote vibrating communicators shown in FIGS. 9a and 9b can also be used in an office environment to allow the user to respond to incoming calls—regardless of whether or not their primary office phone is mobile. In other words, even in the case of an incoming call on a standard, non-mobile office desk phone, the activation of a courtesy mode function can provide the time required not only for an individual to exit a meeting, but also to walk to their desk where their phone is located. This capability is also advantageous when their office phone is, in fact, mobile, but for whatever reason, they have left their phone at their desk. To implement such a capability when the mobile phone or wireless PDA is not in the same room with the remote controller/communicator or when the office phone system supports only non-mobile desk phones, the office building may need to be designed with transceiver capabilities distributed throughout the building so that the transmissions to and from the remote controller/communicator do not have to pass through walls or travel long distances.

Figure 10B:
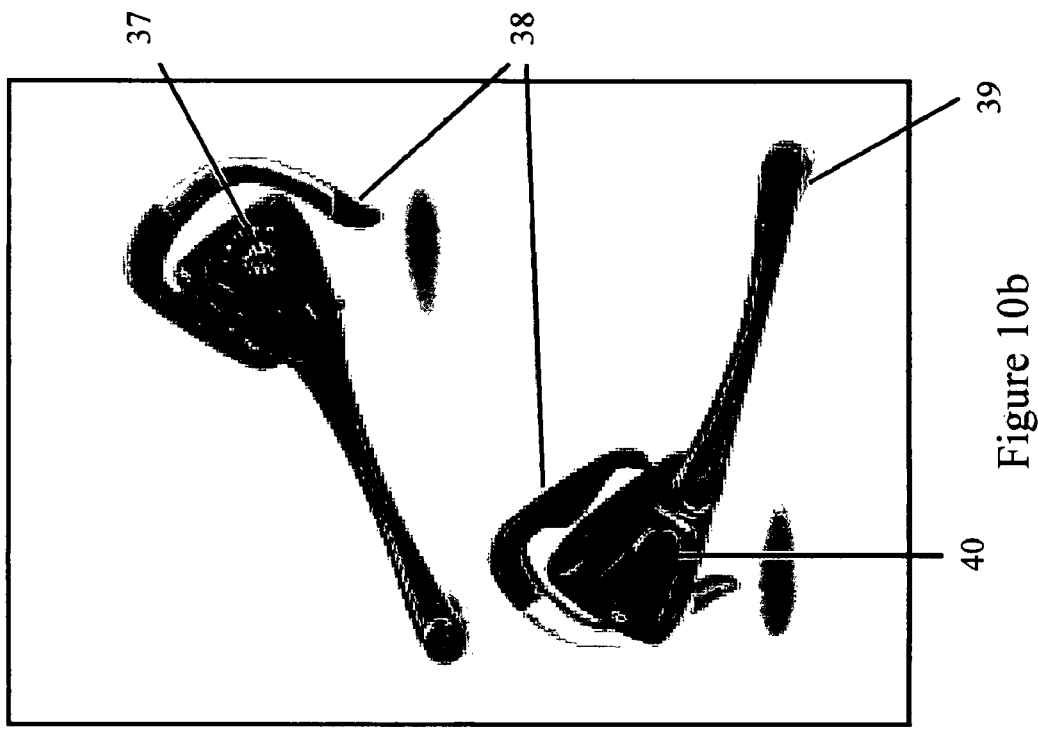
FIG. 10 shows one possible implementation for the remote controller/communicator functions of this invention combined with those of a wireless headset.
Figure 10A:

Another form of remote vibrating communicator described as part of the present invention is one that is combined with a wireless headset. Wireless headsets are increasing in popularity due to their high convenience factor, safety factor while driving, and recently, digital wireless communications mechanisms such as the "Bluetooth" standard have been employed to allow a more clear audio connection through digital processing, or to facilitate digital speech recognition in addition to adding the wireless "freedom" factor. FIG. 10 shows a prior art wireless headset 36 that uses the "Bluetooth" communications standard and is manufactured by Plantronics Corporation. Described herein for reference purposes, this headset in comprised of a main body that includes a miniature speaker 37 and microphone 39. Attached to the main body is an ear loop 38 that pivots to allow it to adapt to the structures of different ears, and to make it easier to put in place on the ear. Also included is button 40 that performs the "send/answer" and "end call" functions, so the user can execute these functions without having to touch their mobile phone.

The remote vibrating communicator of this invention can be combined with a wireless headset function to reduce the number of accessories the user must deal with while further increasing the overall convenience provided to the user. FIG. 11 shows one possible form that includes combining these functionalities. Since the unit must be compact and fit comfortably in a pocket, holster, or belt clip, the embodiment shown in FIG. 11 shows both the ear clip 45 and microphone extension 46 as folding such that they become integral with main body 41 until needed for an actual conversation. Earphone speaker 44 is contained in main body 41 while microphone 47 is located at the tip of microphone extension 46. To convey caller ID and other information to better enable incoming calls to be processed, main body 41 includes display 42. Also shown are buttons 43, that for example, can perform the following functions:
1) send/answer/end
2) courtesy mode
3) send-to-voicemail Other combinations of functions could, of course, be assigned to these buttons and unit could be designed to have a lesser or greater number of buttons. Note that buttons 43 are positioned such that they can be easily operated while the unit is attached to the user's ear, the button locations being easily located by "feel" alone. Note also that many other physical configurations for the functions embodied in FIG. 11 are possible, and that the specific configuration shown here is simply one example.

Also shown in FIG. 11 is an icon 48, in this example shown as a "®", that represents the "flashing icon" referred to previously in this specification as a silent form of ring indication. The term "flashing" can mean that the icon, when activated, alternately appears and disappears. Another form of "flashing" can have the icon alternately reversing its light and dark areas. Many schemes are possible. Any form of flashing icon would typically be activated after the user of a mobile phone or remote controller/communicator has pressed at least one button, thereby indicating to the device that they are aware of an incoming call, and it is therefore all right to cease any audible ring or vibration or both, this flashing icon taking over the ring indication function.

As mentioned earlier, references in this specification to the "Service Provider" may be interpreted to be a conventional mobile service provider such as Sprint, Verizon, CellularOne, Nextel, etc., or alternately, equipment located locally within an office building or office campus, or some combination of a conventional mobile service provider and local equipment functioning in unison or collaboration. In the case of such a collaboration, the user's mobile phone becomes an extension of their office phone, and vice versa, regardless of where they are located. This requires the equipment in the business office to be linked and coordinated with the cellular (mobile) service provider, including functions like local messaging, paging, voicemail, in addition to coordination with receptionists and administrative assistants at the office, offering all the capabilities that exist in conventional business office phone systems. To accomplish this collaboration, the most effective way may be to install a local cellular base station in each office building, these base stations connected to the cellular service provider in the normal manner. The business voicemail recording system could reside at the cellular service provider's location (the usual means), or possibly reside within the office building itself. To function with consistently acceptable signal quality within the structure of an office building, such a local cellular base station installed within the building may need a network of distributed transceivers and/or antennas running throughout each building.

Therefore, a method and accessories for answering mobile phones and office phones, including cellular phones and wireless communication devices with voice capability, has been described that includes a special courtesy mode that enables the receiving party to not miss the call while in a meeting at an office, at a gathering, or at a restaurant where mobile conversations are either prohibited or would be disruptive to others, and at the same time not inconveniencing, confusing, or aggravating the caller.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A wireless remote controller configured to answer a call from a caller to a mobile phone and being configured for bi-directional communications with the mobile phone, the wireless remote controller comprising:
   a display configured to display caller ID information transmitted from the mobile phone;
   numerical buttons configured for entering user selectable command information;
   a function key configured for entering a type of action to be taken;
   a vibrating ring indicator responsive to information transmitted from the mobile phone, and
   the wireless remote controller being configured to send the user selectable command information to the mobile phone to initiate a courtesy mode, wherein a courtesy message is determined based on the user selectable command information and the function key and wherein the courtesy message indicates a courtesy period to the caller, the courtesy period being defined by the user selectable command information.

2. The wireless remote controller of claim 1, wherein the function key is one of a plurality of function keys.

3. The wireless remote controller of claim 1, further comprising the function key configured to answer the call in a conventional manner.

4. The wireless remote controller of claim 1, wherein the user selectable command information includes a command that indicates to the mobile phone that the call should be sent to voicemail.

5. The wireless remote controller of claim 4, wherein the user selectable command information sent to the mobile phone indicating that the call should be sent to voicemail causes a voicemail greeting to be played.

6. The wireless remote controller of claim 1, further comprising a visible courtesy mode indicator.

7. The wireless remote controller of claim 1, wherein the user selectable command information includes a command indicating that any audible ring indication emitted from the mobile phone should terminate and be replaced by a vibrating ring indication on the mobile phone.

8. The wireless remote controller of claim 1, wherein the user selectable command information includes a command indicating that any audible ring indication emitted from the mobile phone should terminate and be replaced by a flashing icon ring indication on the mobile phone.

9. A wireless remote headset configured to answer a mobile phone call from a caller, the wireless remote headset comprising:
   a communications capability for bi-directional voice and data communications with a mobile phone;
   a display configured to display caller ID information transmitted from the mobile phone;
   numerical buttons configured for entering user selectable command information;
   a function key configured for entering a type of action to be taken;
   a vibrating ring indicator responsive to information transmitted from the mobile phone; and
   the wireless remote headset being configured to send to the mobile phone the user selectable command information to initiate a courtesy mode, wherein a courtesy message is determined based on the user selectable command information and the function key and wherein the courtesy message indicates a courtesy period to the caller, the courtesy period being defined by the user selectable command information.

10. The wireless remote headset of claim 9, wherein the user selectable command information sent to the mobile phone includes a command configured to cause an alteration of a ring mode of the mobile phone.

11. The wireless remote headset of claim 10, wherein the command configured to cause an alteration of the ring mode also causes any audible ring indication to be terminated.

12. The wireless remote headset of claim 9, further comprising a visible courtesy mode indicator.

13. The wireless remote headset of claim 9, wherein the user selectable command information includes a command that causes the call to be sent to voicemail.

14. The wireless remote headset of claim 9, further comprising a first function key configured to answer the call in a conventional manner.

15. A wireless remote controller configured for bidirectional communication with a mobile phone, the wireless remote controller being configured to selectively enable delayed establishment of an incoming call from a caller, the wireless remote controller comprising:

a display configured to show caller ID information for the incoming call;

numerical buttons configured for entering user selectable command information;

a courtesy mode function key configured to activate a courtesy mode of operation by sending the user selectable command information to the mobile phone and triggering dispatch of a courtesy message from the mobile phone to the caller, the courtesy message indicating a courtesy period to the caller, the courtesy period being defined by the user selectable command information; and a silencing function key that sends a signal to the mobile phone to automatically cease any audio call arrival indication generated by the mobile phone.

16. The wireless remote controller of claim 15, further comprising a function key configured to answer the call in a conventional manner.

17. The wireless remote controller of claim 15, further comprising a send-to-voicemail function key configured to invoke a voicemail function.

18. The wireless remote controller of claim 15, further comprising a visible courtesy mode indicator.

* * * * *